(12) United States Patent
Huang et al.

(10) Patent No.: US 7,876,347 B2
(45) Date of Patent: Jan. 25, 2011

(54) FOCUSING CONTROL METHOD FOR LABEL SIDE OF LIGHTSCRIBE DISCS

(75) Inventors: Shih-Wei Huang, Taoyuan County (TW); Shih-Jung Huang, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 496 days.

(21) Appl. No.: 12/125,064

(22) Filed: May 22, 2008

(65) Prior Publication Data

US 2009/0022018 A1    Jan. 22, 2009

(30) Foreign Application Priority Data

Jul. 19, 2007    (TW) ............................... 96126492 A

(51) Int. Cl.
    *B41J 2/47*    (2006.01)
(52) U.S. Cl. .................................... 347/225
(58) Field of Classification Search ............. 369/44.25, 369/43, 44.11, 44.32, 53.23, 53.22; 347/224, 347/225
    See application file for complete search history.

(56) References Cited

U.S. PATENT DOCUMENTS

| | | | |
|---|---|---|---|
| 4,374,323 A * | 2/1983 | Winslow et al. .......... 369/44.26 |
| 7,084,894 B2 * | 8/2006 | Van Brocklin et al. ...... 347/224 |
| 7,196,715 B2 * | 3/2007 | Hanks .......................... 347/224 |
| 2007/0064085 A1 * | 3/2007 | Lipinski ...................... 347/224 |
| 2007/0188587 A1 * | 8/2007 | Kwasny et al. .............. 347/224 |
| 2007/0247512 A1 * | 10/2007 | Hsu et al. ................... 347/224 |

* cited by examiner

*Primary Examiner*—Joseph Haley
*Assistant Examiner*—Nicholas Lee
(74) *Attorney, Agent, or Firm*—Winston Hsu; Scott Margo

(57) ABSTRACT

A focusing control method on a light-scribed disc firstly focuses a base voltage on a label side. Light summed signals are detected and recorded. The biggest light summed signal is determined, and subtracts the light summed signal of each spoke to form an error signal. The error signal is multiplied by a gain to form a gain signal. The base voltage adds the gain signal to form an upper referring voltage, and subtracts the gain signal to form a lower referring voltage. The label side is focused with the upper referring voltage and the lower referring voltage respectively. The light summed signals are detected and recorded, to determine the biggest light summed signal of each spoke. According to the corresponding voltage of the biggest light summed signals, a focusing control curve is approached to determine optimum parameters.

13 Claims, 10 Drawing Sheets

FOCUSING CONTROL METHOD FOR LABEL SIDE OF LIGHTSCRIBE DISCS

BACKGROUND OF THE INVENTION

1. Field of the Invention

The invention relates to a focusing control method for an optical drive, and particularly relates to an optical drive with a lightscribe function for producing accurate laser-scribed patterns on the label side of a disc.

2. Description of the Prior Art

For an optical drive with a lightscribe function, the desired label pattern is scribed by a laser beam emitted from the optical pickup unit and focusing on a label side of the disc that is spread with a layer of coating material. When the emitted power of the laser beam exceeds a threshold, the label side of the disc will change and the label pattern will be scribed. However, the optical pickup unit has to constantly focus the laser beam on the label side of a spinning disc in order to obtain the desired label pattern.

When focusing on the data side of a disc, it is known that the pickup unit is driven by a voltage-generated electromagnetic force to move up and down. The laser beam from the pickup unit is then sent to the disc. As the emitted laser beam is reflected by the data side of the disc, it illuminates a transducer. The focusing error (FE) signal is generated according to the magnitude of different illuminated positions. As the FE signals are input to a focusing serve unit according to the magnitude of the FE signal, the optical pickup unit is moved up and down to keep the laser beam constantly focused on the data side. However, the coating material of the label side is not as uniform as that of the data side and the reflection of the light on the label side is not as good as that of the data side. The magnitude and the stability of the FE signal reflected from the label side are not adequate for the focusing serve unit.

FIG. 1 illustrates a conventional label side focusing control method. The optical drive drives an object lens 2 of the pickup unit 1 to move up and down according to the voltage-generated electromagnetic force and keeps the pickup unit 1 emitting a laser beam on the label side of the disc D. As the laser beam is reflected from the label side of the disc to the pickup unit 1, it illuminates the transducer 3. The transducer 3 comprises four equal-size optical receiving sections A, B, C, and D. Each of the optical receiving sections receives different reflected lights from different zones of the reflected laser beam and converts the different reflected lights into corresponding electronic signals. After the electronic signals corresponding to A, B, C, and D are amplified and summed by the amplifier 4, the resultant signal with greater magnitude, called the light summed signal $S_S$, is generated. When the pickup unit 1 moves up and down by a predetermined distance P, the amplifier 4 generates the relevant light summed signal $S_S$ with a waveform $W_S$. When the focal point $F_P$ is exactly located on the label side of the disc, the magnitude of the light summed signal $S_S$ is the maximum. The magnitude of the reflecting light may decrease when the focal point $F_P$ moves away from the label side, however. If the label side is placed at the middle of the predetermined distance P, the waveform $W_S$ of the light summed signal $S_S$ is symmetric with respect to the middle of the predetermined distance P. The sum of the waveform $W_S$ in the upper half of the predetermined distance P is equal to the sum of the waveform $W_S$ in the lower half of the predetermined distance P (the waveform in the solid line). Otherwise, the sum of the waveform $W_S$ in one portion may be larger than the sum of the waveform $W_S$ in another portion when the label side is placed at the corresponding portion with respect to the middle of the predetermined distance P (the waveform in the dashed line).

Currently, in the general focusing control method for the label side, the difference between the light summed signals of the top and bottom side of the label side is used to determine the focal point and offset of the label side and thus control the focusing. FIG. 2 shows corresponding curves of the voltage signals for determining the difference of the light summed signals. The label side of a disc is sectioned into 400 radial spokes. Each section has an equal degree of angles in the angular coordinate. The 400 spokes are split up into eight groups and thus there are 50 spokes in each group. When the optical pickup unit circles around a ring of the label side of an optical disc, the optical pickup unit is pushed up by a triangular signal during the focusing on half of the 50 spokes, as shown in FIG. 2(a). The light summed signal is generated accordingly. As the optical pickup unit circles around another ring of the label side of the optical disc, the optical pickup unit is pushed down by another triangular signal during the focusing on half of the 50 spokes, as shown in FIG. 2(b). Another corresponding light summed signal is generated. As shown in FIG. 2(c), the light summed signals in FIG. 2(a) substrates the light summed signals in FIG. 2(b) group by group to generate difference values. The variation of the label side in the vertical direction can thus be determined via the difference values corresponding to each group of spokes. After the variation is obtained, the parameters of a corresponding control voltage are determined by adaptive control means and the optical pickup unit is controlled to move up and down to focus on the label side.

However, when the optical pickup unit moves from an inner circle to an outer circle to scribe a pattern on the label, the optical pickup unit may be seriously out of focus due to the variation in the vertical direction of the outer circle being much greater than the variation in the vertical direction of the inner circle. This problem can arise due to raising, buckling, or vibrating of the disc or the structure of the optical drive. When the problem occurs, even if the voltage of the triangular signal is adjusted, the optical pickup unit may remain out of focus. The light summed signal cannot reveal the difference precisely resulting in inaccurate parameters of the voltage control curve. A clear pattern on the label side therefore cannot be obtained and, in a worst situation, the pattern may not be able to be scribed. Hence the conventional label side focusing control method has problems that have to be solved.

SUMMARY OF THE INVENTION

One objective of the invention is to provide a label side focusing control method for discs. In the method, the control voltage, which is varied along with the label side in the vertical direction, is generated according to error signals generated from the light summed signals that are obtained by employing the base voltage.

Base voltage and the error signal are utilized to generate an approximate voltage control curve and accurate parameters are obtained to precisely control the focusing on the label side.

Both the accuracy of the focusing on the label side and the quality of the scribed pattern are improved by applying the focusing control method with respect to each of the spokes.

The obtained voltage control curve is measured and its accuracy is examined. By approximating the actual voltage control curve repeatedly, the focusing on the label side can be precisely controlled.

In order to achieve the mentioned objectives of the present invention, the label side focusing control method applies the base voltage to the focusing on the label side. The resultant light summed signal is measured and recorded. Then the error signal is obtained after subtracting light summed signals of each spoke from the largest light summed signal and the gain signal is produced according to the magnified error signal. Next, the upper reference voltages $V_{UF}$'s can be defined by adding each of the gain signals to the base voltage. The lower reference voltages $V_{LF}$'s are defined by subtracting each of the gain signals from the base voltage. By applying the obtained upper and lower reference voltage to control the focusing voltage, the resulting light summed signals can be detected and recorded. After finding the largest light summed signal of each spoke and employing the corresponding control voltage of the obtained largest summed signals, i.e. $V_{UF}$'s or $V_{LF}$'s, the approximate focusing control voltage curve can be obtained by curve fitting means. Finally, by the approximate focusing control voltage curve, the optimum parameters for focusing control can be determined.

In addition, in the present invention of label side focusing control method for discs, as the approximate focusing control voltage curve and parameter for focusing control are obtained, the obtained focusing control voltage curve is applied to label side focusing control. The actual light summed signals of the label side are measured by moving the corresponding device to circle around the label side of a disc once. The distance is defined by subtracting the smallest light summed signal from the largest light summed signal. The distance is checked to see if the value is less than a threshold. If the resultant difference is greater than the threshold, the error signals are multiplied by a new gain. Again, a new approximated focusing control voltage curve can be obtained after the new gain is applied. If the resultant difference is less than the threshold, then the new focusing control voltage curve is taken as the focusing control voltage.

These and other objectives of the present invention will no doubt become obvious to those of ordinary skill in the art after reading the following detailed description of the preferred embodiment that is illustrated in the various figures and drawings.

DETAILED DESCRIPTION

To achieve the above-mentioned objectives, the preferred embodiments are described in conjunction with the figures for better illustration of the employed technique and the effect thereof of the present invention.

Figure 1:
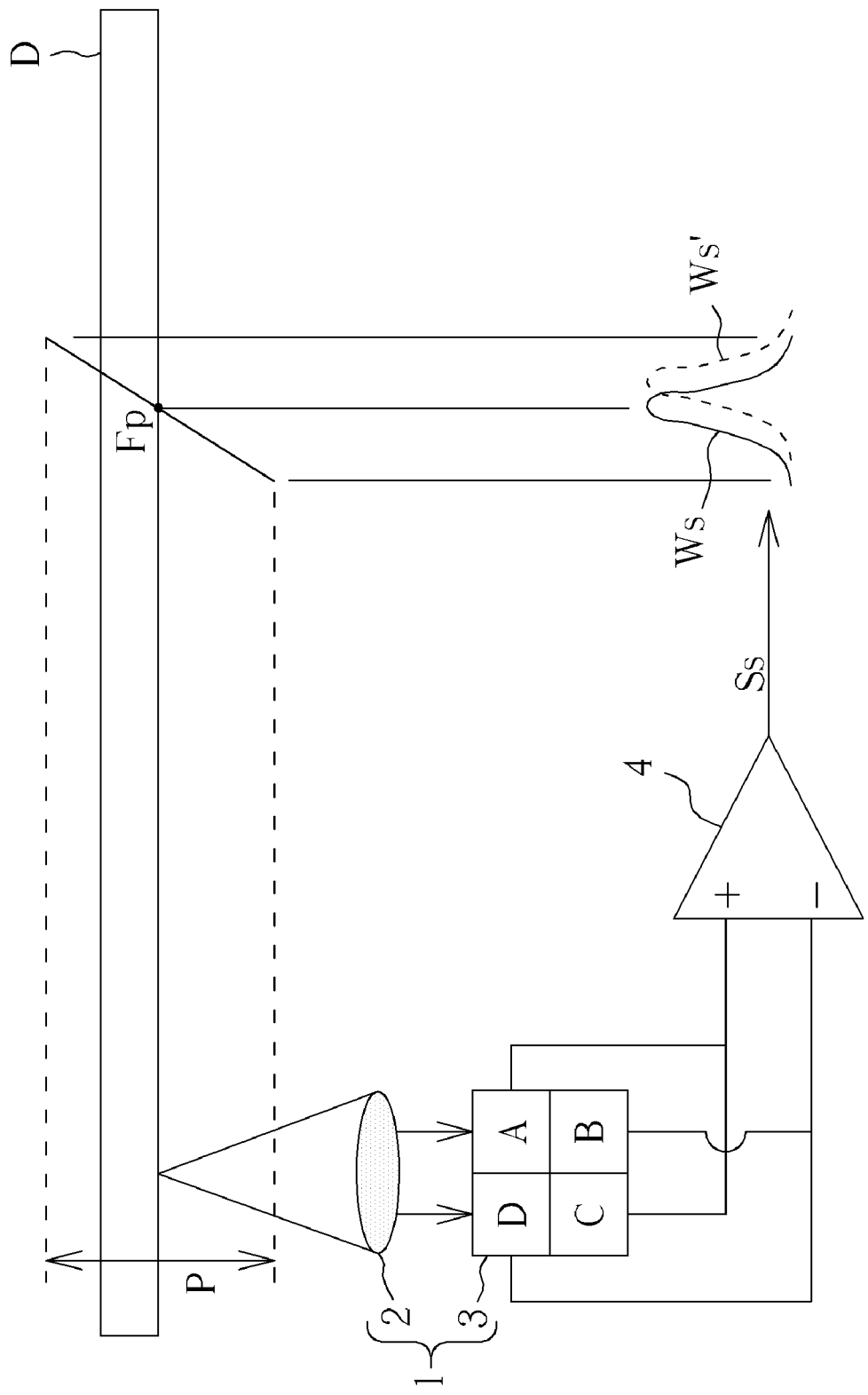
FIG. 1 is an illustration of a conventional label side focusing control method for discs.
Figure 2:
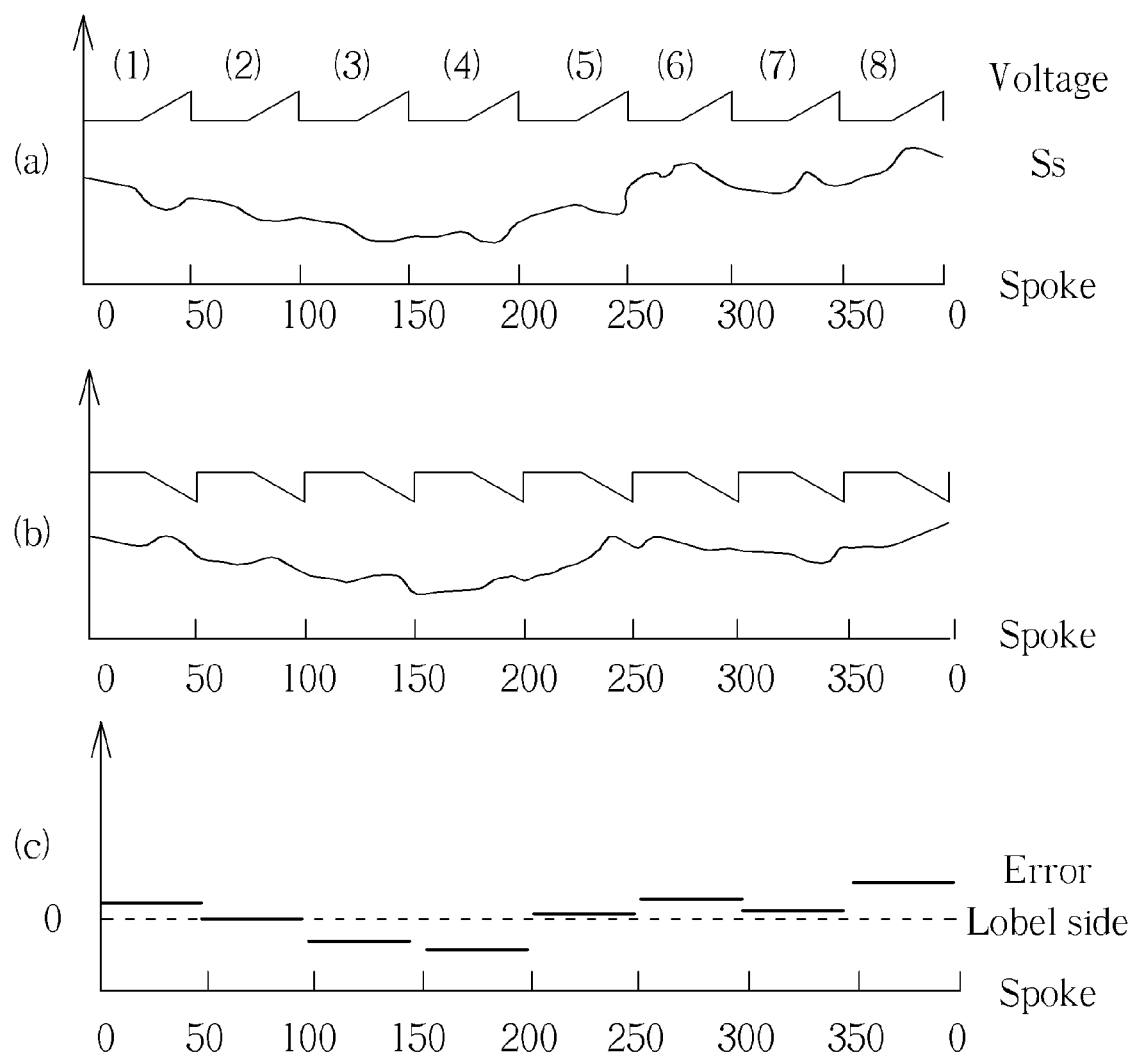
FIG. 2(a)-(c) are illustrations of light summed signals of the conventional label side focusing control method for discs.
Figure 3:
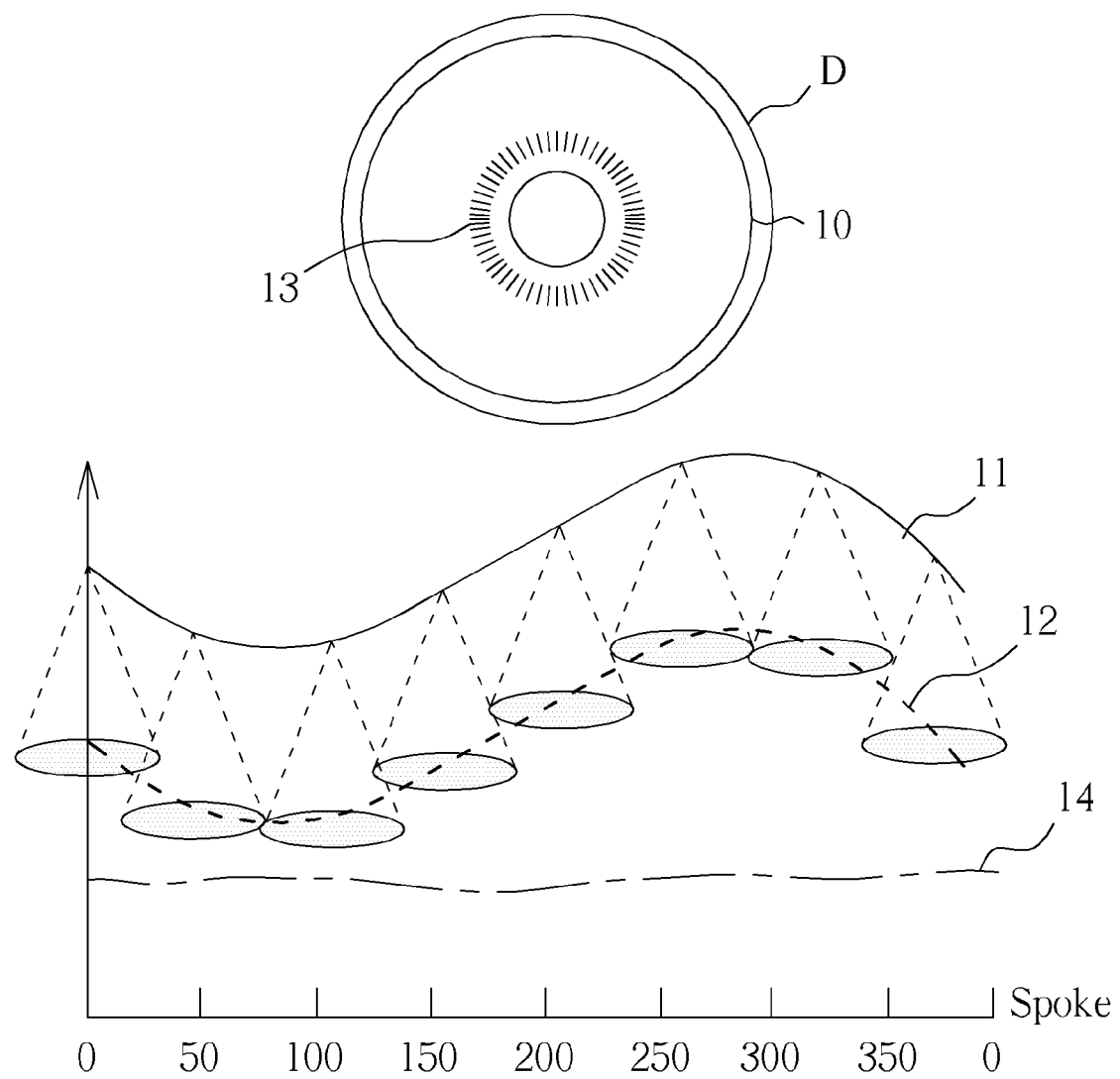
FIG. 3 is an illustration of an ideal label side focusing control method for discs.

FIG. 3 illustrates an ideal condition of label side focusing control for a disc. When the focusing control is performed, the pickup unit circles once around the ring of the outer circle 10 of the label side of the disc D. The variation in the vertical direction of the outer circle 10 of the label side of the disc D is represented by the outline curve 11. If the optical pickup unit can be controlled by a voltage curve 12 whose variation is the same as the outline curve 11, the beam emitted by the optical pickup unit can constantly be focused on the label side and the corresponding light summed signals of each spoke 13 along the path of focusing can always be the maximum value. Ideally, the maximum value is a constant, i.e. the obtained light summed signal 14 is a horizontal line that does not vary with the outline curve 11. However, in practice, the light summed signal curve 14 varies slightly and is not an exact horizontal line, due to the delay and assembling characteristic of the optical drive system.

Figure 4:
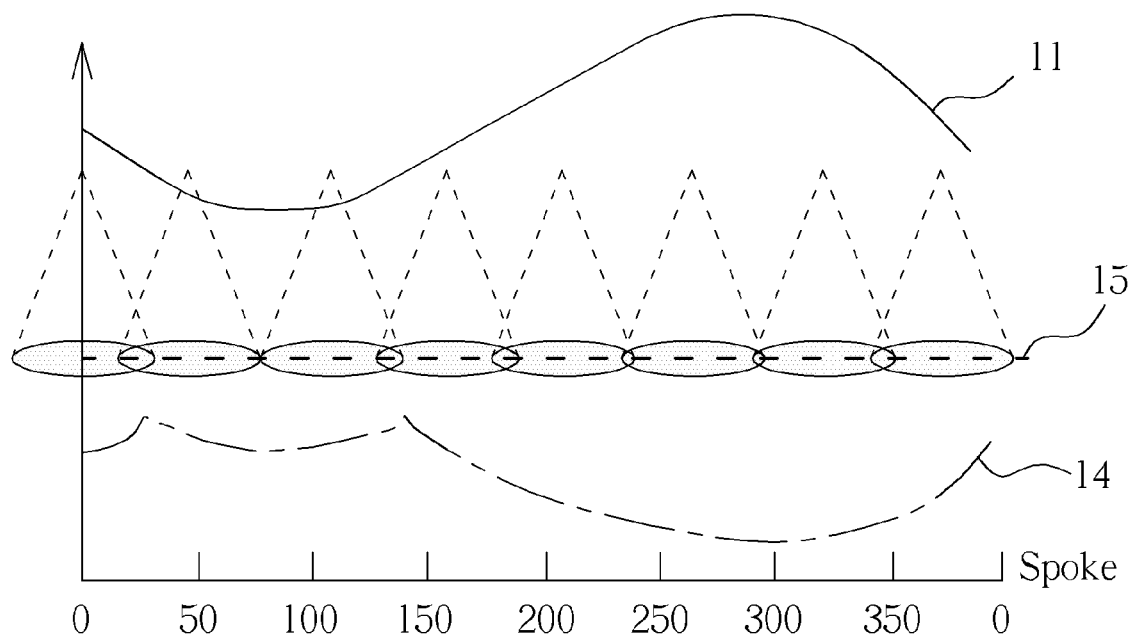
FIG. 4 is an illustration of a light summed signal detected by employing the base voltage in the presented invention.

FIG. 4 illustrates associated results of the light summed signal being detected by employing the base voltage according to an exemplary embodiment of the invention. In the label side focusing control method of the disc according to the embodiment, the optical pickup unit utilizes a predetermined base voltage 15 to emit a laser beam on the label side. Since the base voltage 15 is fixed, the optical pickup unit is also moved to a fixed height against the label side to emit the laser beam. Hence, the focal point of the laser beam emitted by the optical pickup unit is at a fixed height and does not vary with the outline curve 11. The outline curve 11 and the focal point at a fixed height form a relative distance of varying values. The light summed signal detected from different positions may vary since the corresponding distance has varying values. Hence, the light summed signal curve 14 consists of the light summed signals obtained from different positions and the outline curve 11 of the label side form a pair of correspondent curves. These two curves, the light summed signal curve 14 and outline curve 11, are similar but opposite in some parts.

Figure 5:
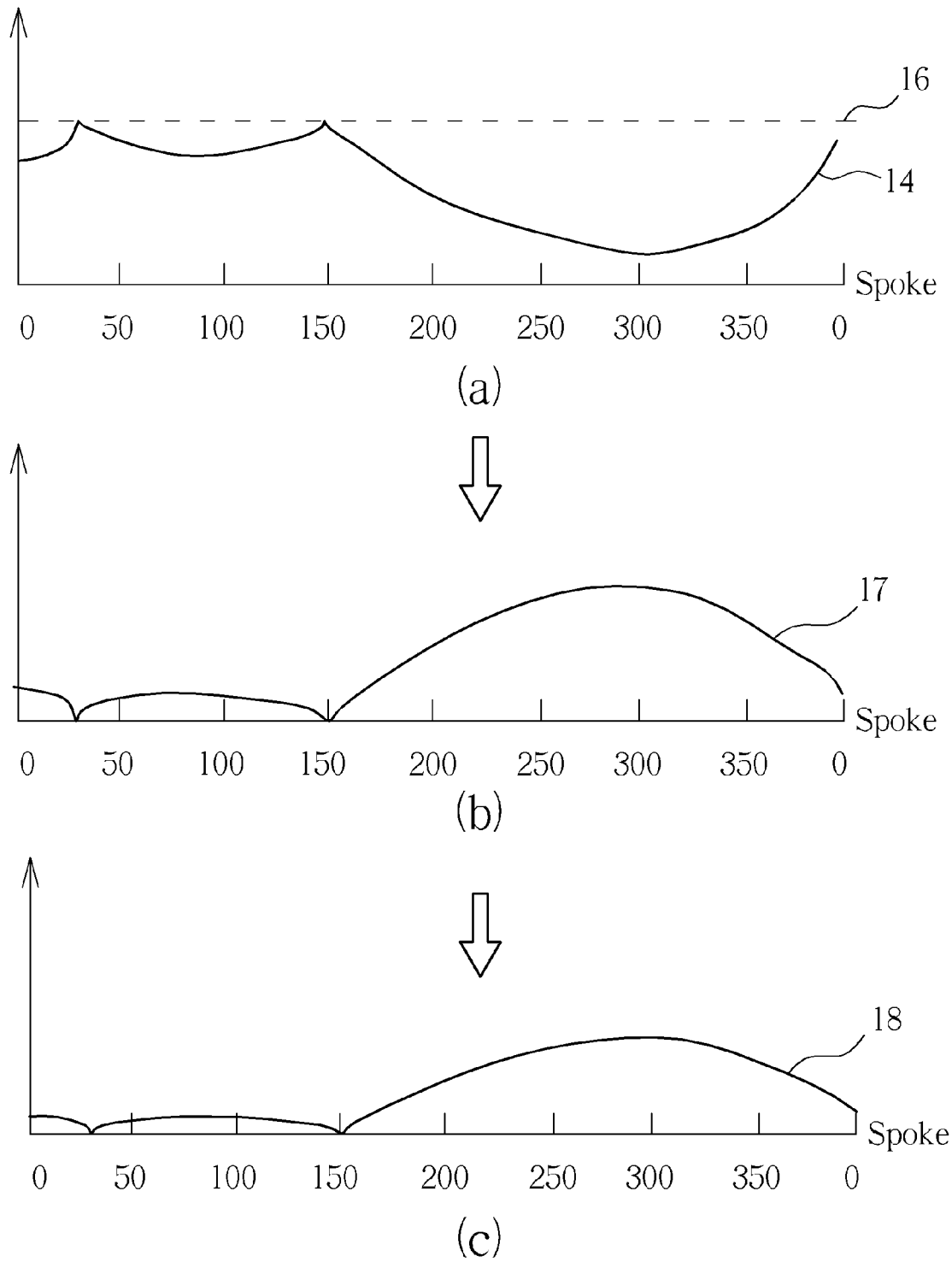
FIG. 5(a)-(c) are illustrations of operational processing of the light summed signal in the present invention.

The operational processing of the light summed signals is shown in FIG. 5(a)-(c). In order to take advantage of the similarity between the light summed signal curve 14 and the outline curve 11, first, the largest light summed signal 16 is found according to the light summed signal 14 as shown in FIG. 5(a). FIG. 5(b) shows the error signal 17, which is generated by subtracting the light summed signal 14 from the largest light summed signal 16. Then in FIG. 5(c), according to the scale of the base voltage 15, the error signal 17 is multiplied by a gain and then the error signal 17 is normalized to the scale of the base voltage 15 to generate the gain signal 18.

Figure 6:
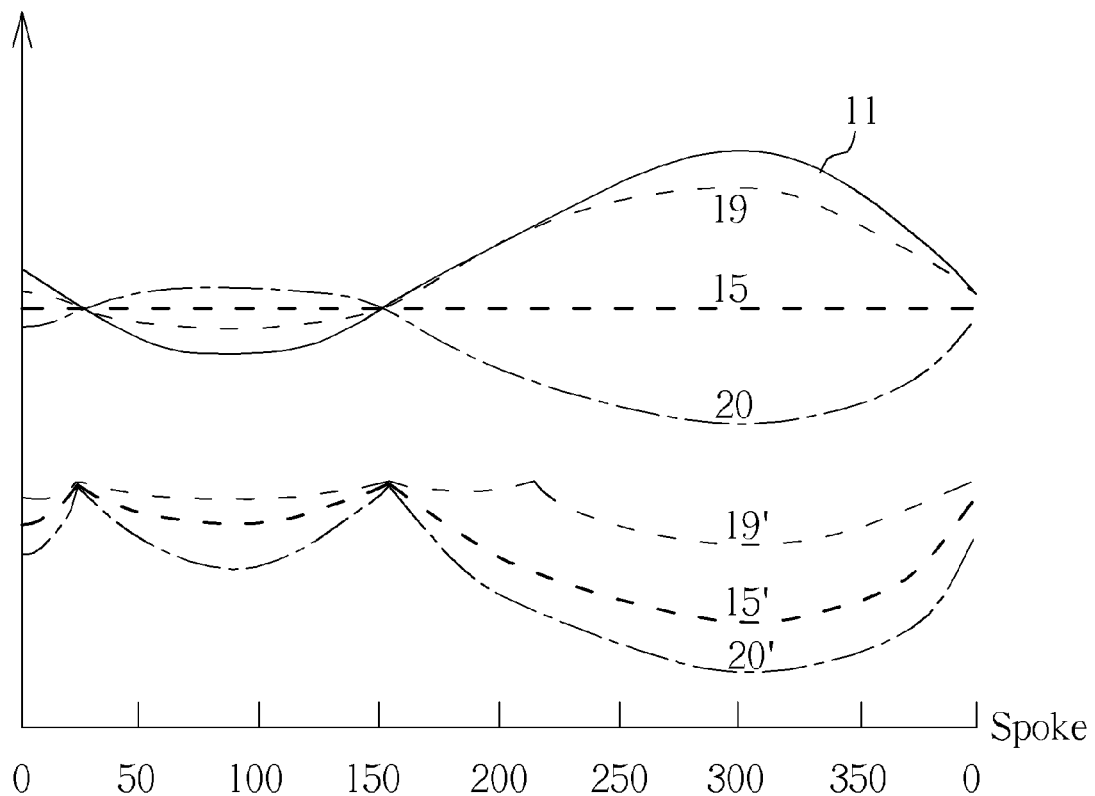
FIG. 6 is an illustration of the processing of voltage signals in the present invention.
Figure 7:
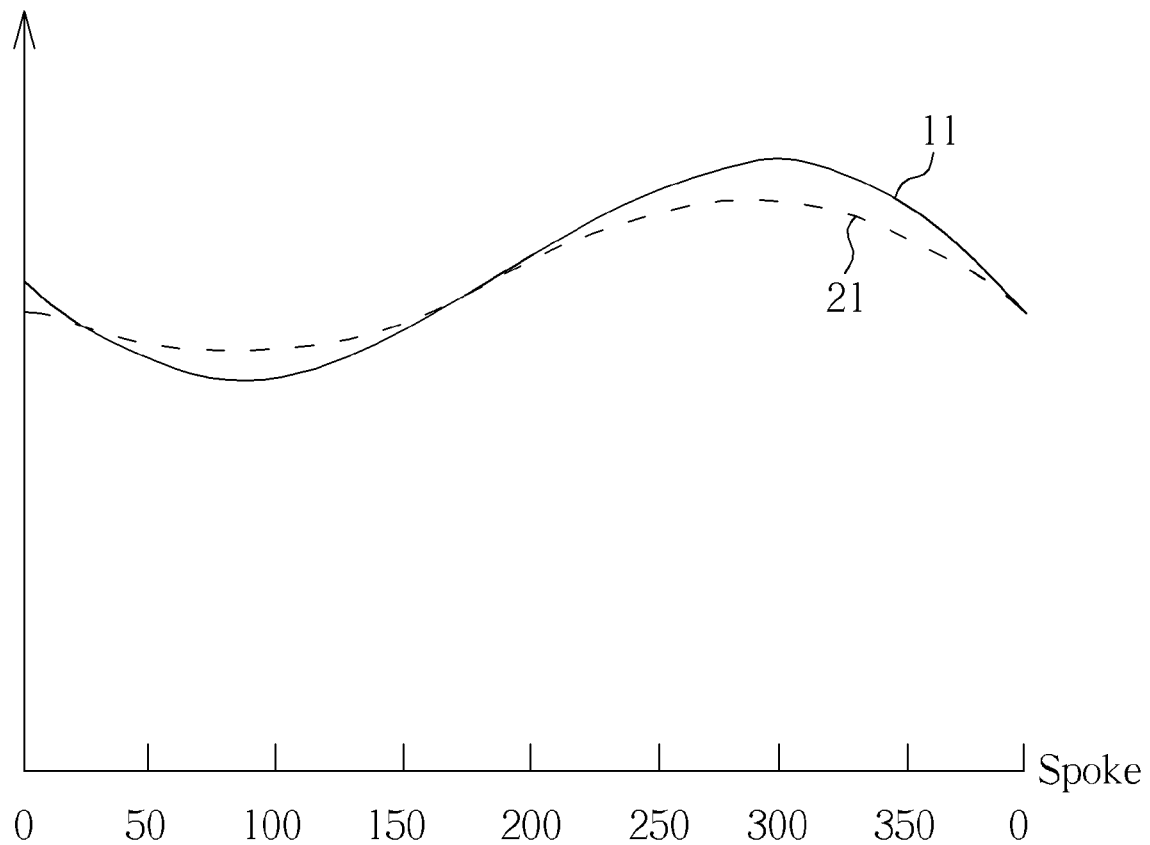
FIG. 7 is an illustration of the resultant approximate focusing control voltage curve in the present invention.

FIG. 6 demonstrates the processing of the voltage signals. First, the gain signal 18 is added to the base voltage 15 to define an upper reference voltage 19. Next, the gain signal 18 is subtracted from the base voltage 15 to define a lower reference voltage 20. The base voltage 15, upper reference voltage 19, and lower reference voltage 20 are taken as the focusing control voltage respectively. The optical pickup unit is moved according to each focusing control voltage and emits a laser beam to the label side. The corresponding light summed signals of each spoke are detected and recorded. Then three associated light summed signal curves 15', 19', and 20' are generated and the largest light summed signal corresponding to each spoke can thus be found. As shown in FIG. 7, by applying the corresponding control voltage of the light summed signal curves 15', 19' and 20', i.e. the upper reference voltage 19, the base voltage 15, or the lower reference voltage 20, to the focusing control voltages of each spoke and by means of curve fitting, the approximate voltage curve 21 can be obtained. Specifically, as the approximate voltage curve 21 which varies along with the outline curve 11 of the label side in the vertical direction is obtained, the associated control parameters can be determined by considering the approximate voltage curve 21 to control the focusing on the label side of the disc.

In addition, the focusing control voltage curve can be obtained quickly and processing time can be saved by applying only the upper reference voltage 19 and the lower reference voltage 20 to the focusing control voltage respectively, i.e. the base voltage 15 is eliminated from being the focusing control voltage. The largest light summed signals in the record corresponding to each spoke can be found by utilizing the detected light summed signals of the upper reference voltage 19 and the lower reference voltage 20.

Figure 8:
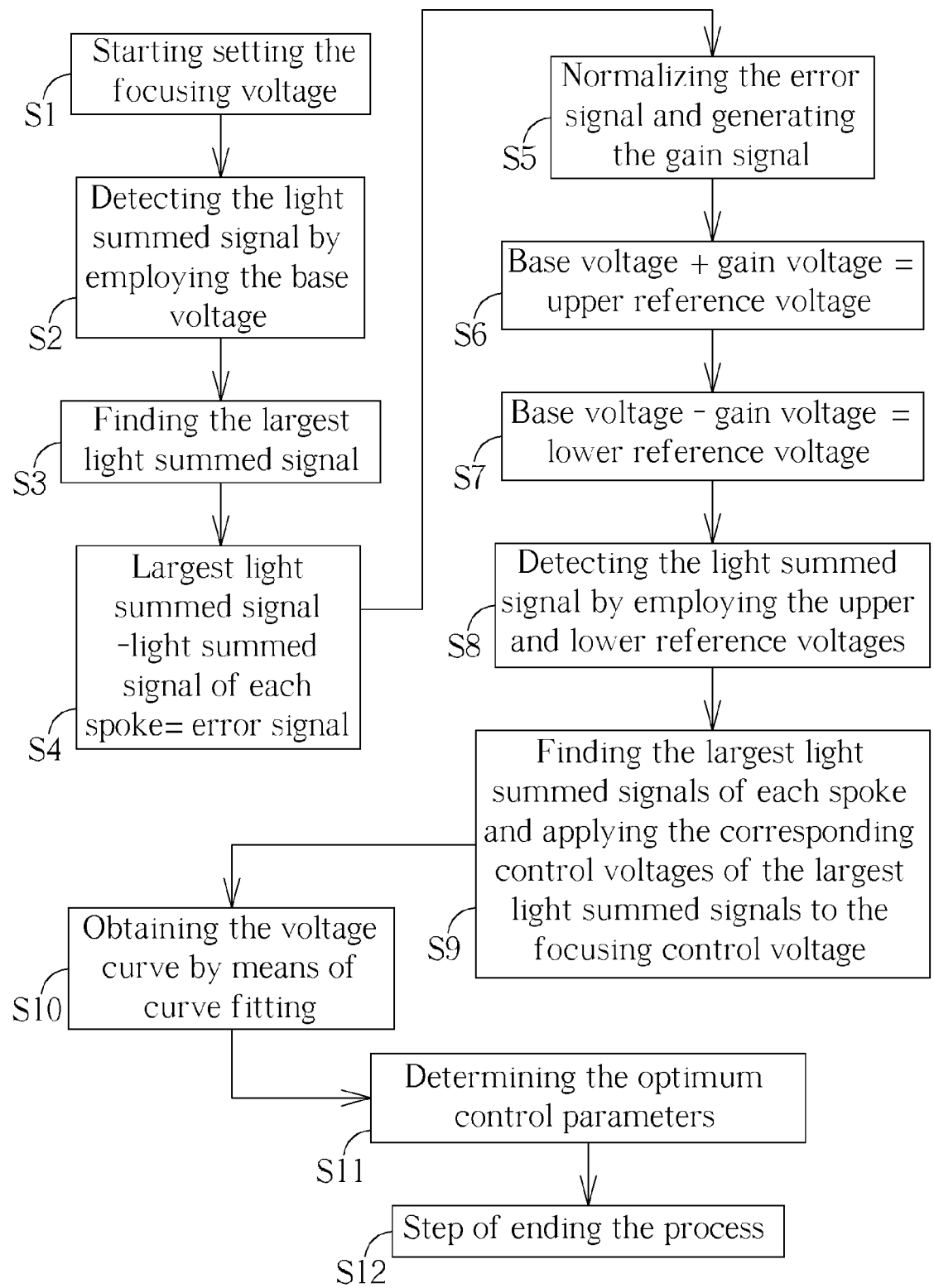
FIG. 8 is a flowchart of the label side focusing control method for discs in a first embodiment of the present invention.

FIG. 8 is a flowchart illustrating the presented label side focusing control method according to the embodiment of the invention. The method utilizes an error signal generated from a base voltage and a light summed signal to obtain an approximate voltage curve along with an outline curve of the label side in the vertical direction. The detailed steps are described as follows:

First, in Step S1, the focusing control voltage on the label side of a disc starts to be set. Next, in Step S2, an optical pickup unit is moved to a specific position by a predetermined base voltage and emits the laser beam to the label side. As the beam circles once around the disc, the light summed signals of each spoke are detected and recorded. The predetermined base voltage is a constant. In order to obtain the largest light summed signal, the optical pickup unit is moved toward the label side such that the focal point of the emitted laser beam can be located exactly on the label side at least once. In Step S3, the largest light summed signal is obtained from the light summed signals recorded in Step S2. In Step S4, the error signal is generated by subtracting the light summed signals of each spoke from the largest obtained light summed signal. In Step S5, because the scales of the error signal and base voltage are different, the error signal is first multiplied by a gain. Then the resultant error signal is normalized to the scale of the base voltage to produce the gain signal.

Next, in Step S6, an upper reference voltage $V_{UF}$ is defined by adding the gain signal to the base voltage. Then, in Step S7, a lower reference voltage $V_{LF}$ is defined by subtracting the gain signal from the base voltage. In Step S8, the upper and lower reference voltages are taken as the focusing control voltage respectively. The associated light summed signals of each spoke are detected and recorded. In Step S9, the largest light summed signals corresponding to each spoke are recorded by comparing the two light summed signal curves generated in Step S8. Then the corresponding control voltage of the obtained light summed signal, $V_{UF}$ or $V_{LF}$, of the corresponding spoke is taken as the focusing control voltage. In Step S10, according to the voltage of different spokes, the approximate voltage curve is generated by curve fitting means. The curve is closely related to the outline curve of the label side in the vertical direction. In Step S11, the optimum parameters of focusing control are determined by considering the approximate voltage curve. Finally, in Step S12, the setting of focusing control voltage curve ends.

From the described steps of the presented label side focusing control method of a disc according to the embodiment of the invention, the error signal is generated according to the light summed signal resulting from the base voltage. Then, by employing the error signal with proper multiplication, the base voltage, and corresponding control voltage of the largest light summed signal of each spoke, the approximate voltage control curve is obtained and control voltage corresponding to the outline curve of the label side in the vertical direction is constructed. From the approximate voltage control curve, the accurate optimum parameters are obtained and the focusing control on the label side is with respect to each spoke. Therefore, the drawbacks of the conventional approach of focusing control voltage, i.e. coarse error of label side focusing control voltage and difficulty of application to the outer circle or the label side with significant variation in vertical direction, are overcome. The focusing on label side can be more precise and the quality of a scribed pattern is improved with the present invention.

Figure 9:
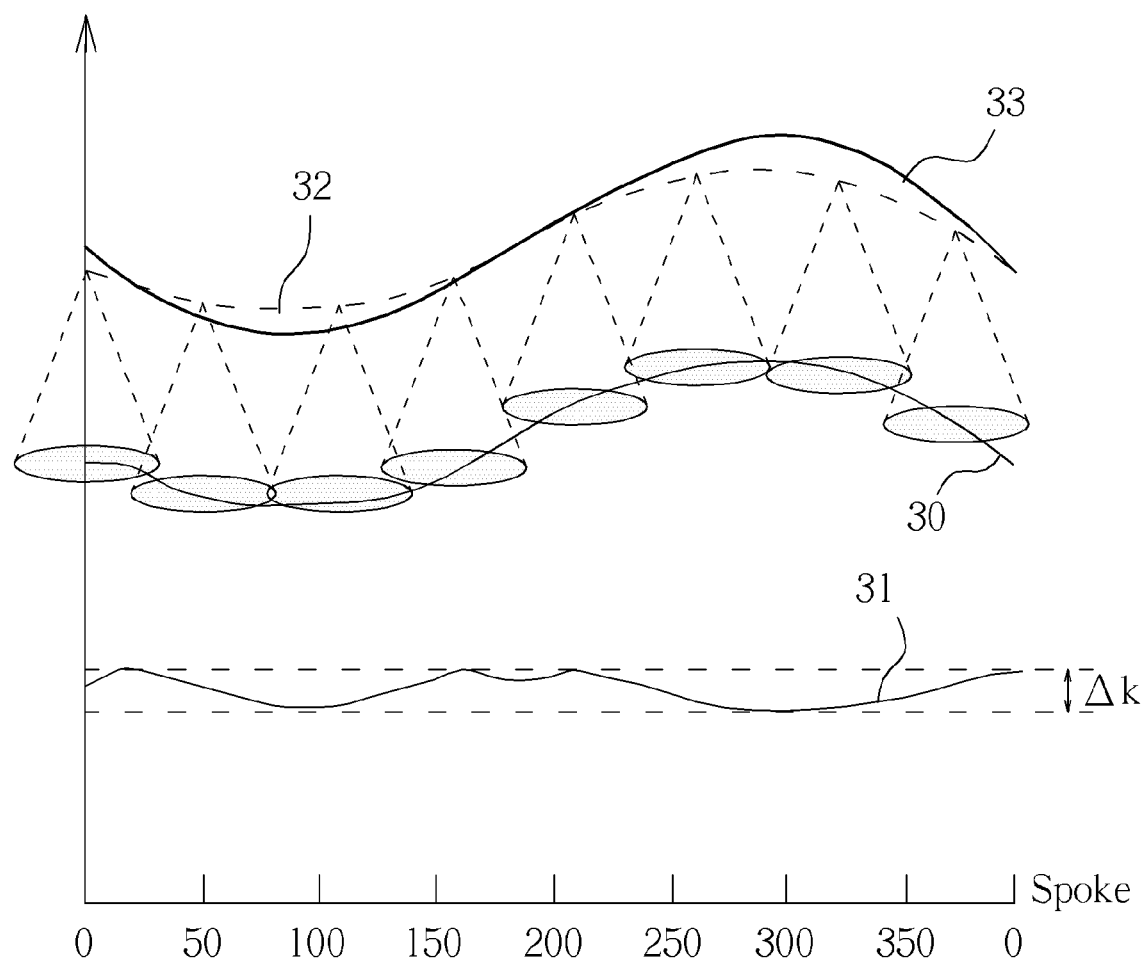
FIG. 9 is an illustration of the measured focusing control voltage curve in the present invention.

FIG. 9 shows a label side focusing control method according to another embodiment of the invention. In the embodiment, the error signal is produced by applying the base voltage for detection of the light summed signal. The resultant gain signal is generated after the multiplication and normalization of the error signal. As a result, the voltage curve can be obtained and the optimum control parameters can be thus determined. Essentially, the above-mentioned steps are identical to the corresponding steps in the first embodiments. However, in this embodiment, the voltage curve 30 and control parameters obtained from the first embodiment are applied to drive the corresponding device to circle once around the label side of a disc and measure the light summed signal 31. In order to understand how close the focal point 32 and the outline curve 33 of the label side are, the distance between the focal point 32 and the outline curve 33 of label side is examined by checking whether the difference $\Delta K$ of the largest and smallest light summed signals is less than a threshold. The corresponding result determines if the voltage curve has to be refreshed.

Figure 10:
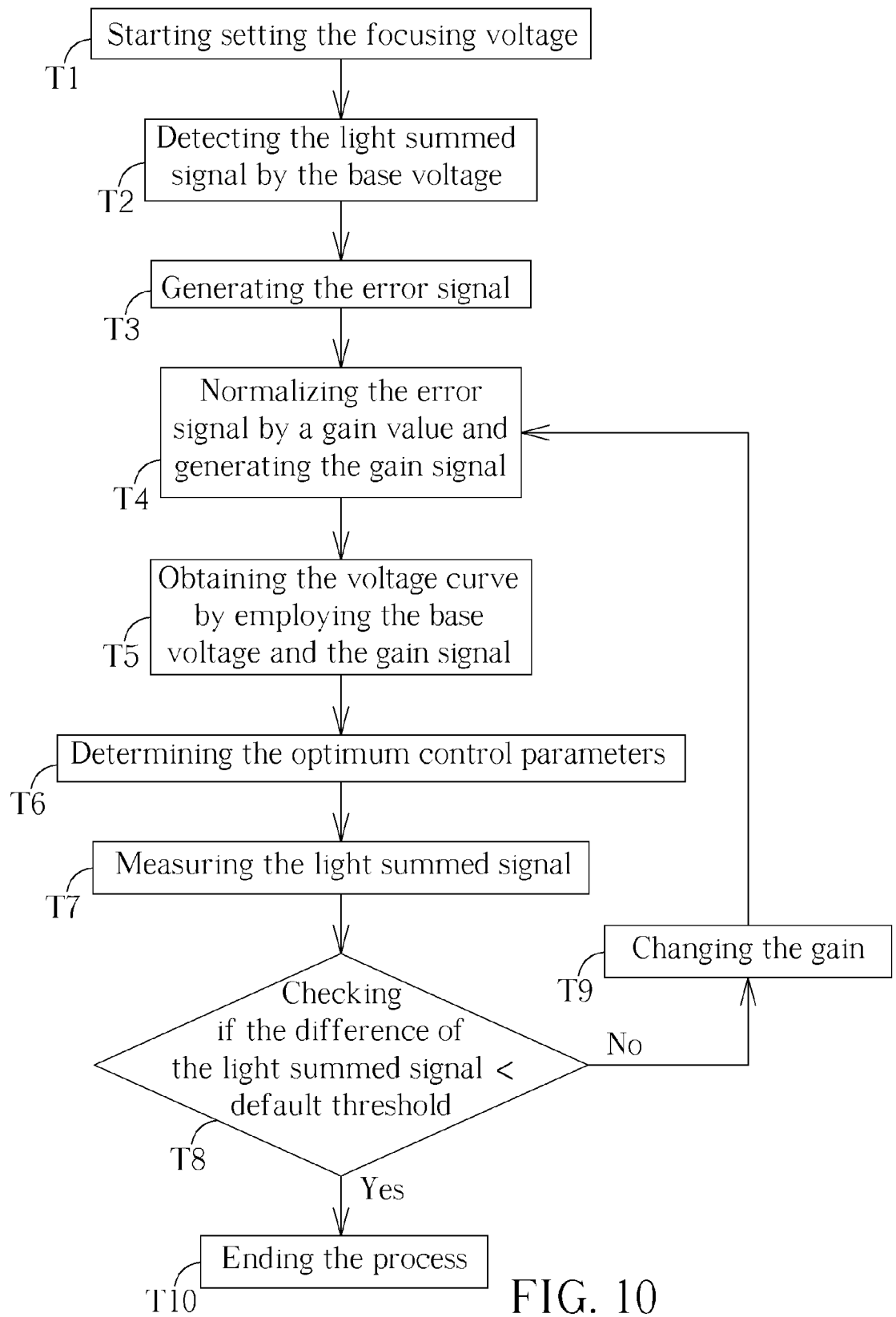
FIG. 10 is a flowchart of the label side focusing control method for discs in a second embodiment of the present invention.

FIG. 10 demonstrates the flowchart of determining whether the voltage curve has to be refreshed. First, in Step T1, the label side focusing control voltage starts to be set. In Step T2, the light summed signal is detected by the base voltage. In Step T3, the error signal is generated. In Step T4, the gain signal is produced after multiplication and normalization of the error signal. In Step T5, the voltage curve is obtained by employing the base voltage and gain signal. Then, in Step T6, the optimum control parameters are determined. Essentially, the functions of steps of Step T1 to Step T6 are similar to the functions of the steps of Step S1 to Step S11 of the first embodiment. These steps are described to aid the following explanation. After the determination of the optimum control parameter of Step T6, in Step T7, the obtained focusing control voltage curve is applied to drive the corresponding device to circle once around the label side and measure the light summed signal. In Step T8, the difference between the largest and smallest light summed signal is checked to see if it is less than a specific threshold. If the difference is greater than the threshold, this indicates the obtained focusing control voltage curve is not accurate enough to approximate the outline curve of the label side. Therefore a new focusing control voltage curve has to be generated. As a result, in Step T9, the value of gain is changed and the whole procedure goes back to Step T4 to approximate a new focusing control voltage curve. On the other hand, if the difference is less than the threshold, which indicates the obtained focusing control voltage curve precisely approximates to the outline curve of the label side, it can be taken as the focusing control voltage curve. Finally, the process ends in Step T10.

Specifically, the presented label side focusing control method according to the second embodiment of the invention can measure the light summed signal with the obtained voltage control curve and associated control parameters. According to a difference resulting from the measured light summed signal, it can be determined whether the step of approximating the voltage control curve has to be repeated. Empirically, in order to achieve fast accurate focusing control on the label side, the step of generating a new approximate voltage control curve needs one trial only when focusing on the inner circle of the label side as compared to one to three trials when focusing on the outer circle. By means of the presented approach, the drawback of inaccurate focusing on a disc with large variation in the vertical direction of the outer circle and resultant unclear pattern of the label side in the conventional focusing method are overcome.

Furthermore, as the label side focusing control method presented in the invention is applicable to discs with large variation in the vertical direction of the outer circle, the presented approach can incorporate the conventional art. That is, when the label side focusing control is for the outer circle of a disc, the convention focusing control method of dividing a disc into eight equal-size pieces can be applied. When the label side focusing control is for the inner circle of a disc, the label side focusing control method presented in the invention can be applied instead. The flexibility is extended and the processing time is saved. In addition, although the base voltage is assumed to be a constant in the mentioned embodiment, the base voltage in the mentioned embodiment can be a variable and is not limited to a constant. For example, the base voltage can be obtained by a better voltage control curve derived from learning mode in the label side focusing control process of a disc. The actual voltage control curve can be approximated by the corresponding error signal. This approach is also included within the scope of the present invention.

The embodiments mentioned above are described for ease of understanding the present invention. The field of the present invention is not limited to the demonstrated embodiments, however. Those skilled in the art will understand that numerous modifications and alterations of the device and method that retain the teachings of the invention are also included within the field of the present invention.

Those skilled in the art will readily observe that numerous modifications and alterations of the device and method may be made while retaining the teachings of the invention.

What is claimed is:

1. A label side focusing control method, comprising the following steps:
   (1) focusing on a label side of a disc according to a predetermined base voltage, and detecting and recording light summed signals corresponding to each spoke of a plurality of spokes along a path;
   (2) finding a largest light summed signal from light summed signals and subtracting other light summed signals from the largest light summed signal to generate an error signal;
   (3) multiplying the error signal according to a gain to generate a gain signal;
   (4) adding the gain signal to the base voltage to generate an upper reference voltage and subtracting the gain signal from the base voltage to generate a lower reference voltage;
   (5) taking the upper reference voltage and the lower reference voltage as a focusing control voltage to control a pickup head to circle once around the label side to detect and record the light summed signals;
   (6) finding a largest light summed signal corresponding to each spoke, and taking a corresponding voltage of the largest light summed signal corresponding to each spoke as a focusing control voltage with respect to the corresponding spoke; and
   (7) approaching each focusing control voltage corresponding to each spoke by curve fitting to generate an approximate control focusing voltage curve.

2. The method of claim 1, wherein the base voltage is used to control an optical pickup unit to circle once around the label side of the disc and focus on the label side.

3. The method of claim 1, wherein the step (1) further comprises:
   measuring and recording the light summed signals of each spoke along the path of the focusing on the label side.

4. The method of claim 1, wherein the predetermined base voltage is a constant.

5. The method of claim 1, wherein the focal point of the optical pickup unit moved by the base voltage locates exactly on the label side at least once.

6. The method of claim 1, wherein the step (3) further comprises:
   multiplying the error signal by a gain such that the error signal can be normalized to a scale of the base voltage.

7. The method of claim 1, wherein the step (5) further comprises:
   adding the predetermined base voltage to the focusing control voltage;
   circling once around the disc; and
   detecting and recording the light summed signals corresponding to each spoke along the path.

8. The method of claim 1, wherein the step (7) further comprises:
   determining an optimum focusing control parameter according to the approximate control focusing voltage curve.

9. The method of claim 1, wherein the step (7) further comprises the following steps:
   (8) applying the approximate focusing control voltage curve to perform a label side focusing control operation;
   (9) checking a difference resulting from the light summed signals, where if the difference is greater than a predetermined threshold, changing the gain and going back to step (3), or if the difference is less than a predetermined threshold, ending the process.

10. The method of claim 9, wherein the step (8) further comprises:
    driving the pickup head to circle once around the label side of the disc to thereby measure the light summed signal of the label side.

11. The method of claim 9, wherein the step (9) further comprises:
    obtaining a difference by subtracting a smallest light summed signal of step (8) from a largest light summed signal of step (8).

12. The method of claim 9, wherein the step (9) further comprises:
    changing the gain by multiplying the difference with a new gain.

13. The method of claim 1 being applied on an outer circle of the disc.

* * * * *